(12) United States Patent
Ackermann

(10) Patent No.: US 9,915,037 B2
(45) Date of Patent: Mar. 13, 2018

(54) SIMPLE APPLICATION OF AN ADHESIVE MATERIAL TO A SUBSTRATE WITH EXCELLENT ADHESION TO ASPHALT

(71) Applicant: SIKA TECHNOLOGY AG, Baar (CH)

(72) Inventor: Herbert Ackermann, Tann (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/150,709

(22) Filed: May 10, 2016

(65) Prior Publication Data

US 2016/0340839 A1   Nov. 24, 2016

(30) Foreign Application Priority Data

May 20, 2015 (EP) ..................................... 15168522

(51) Int. Cl.
| | | |
|---|---|---|
| *E01C 11/00* | (2006.01) | |
| *E01C 7/18* | (2006.01) | |
| *E01C 7/32* | (2006.01) | |
| *C09J 5/08* | (2006.01) | |
| *C09J 123/08* | (2006.01) | |

(52) U.S. Cl.
CPC ............. *E01C 11/005* (2013.01); *C09J 5/08* (2013.01); *C09J 123/0853* (2013.01); *E01C 7/185* (2013.01); *E01C 7/325* (2013.01); *C09J 2203/10* (2013.01); *C09J 2431/00* (2013.01); *C09J 2451/00* (2013.01); *C09J 2463/00* (2013.01); *C09J 2495/008* (2013.01)

(58) Field of Classification Search
CPC ........ E01C 7/185; E01C 7/325; E01C 11/005; C09J 5/08; C09J 123/0853; C09J 2203/10; C09J 2431/00; C09J 2451/00; C09J 2463/00; C09J 2495/008
USPC ................................... 404/31, 75, 77, 79, 95
See application file for complete search history.

(56) References Cited

U.S. PATENT DOCUMENTS

| | | | | |
|---|---|---|---|---|
| 4,080,228 A | * | 3/1978 | Currigan | ............... E01C 23/082 156/247 |
| 4,113,401 A | * | 9/1978 | McDonald | ............... E01C 7/187 404/75 |
| 4,678,363 A | * | 7/1987 | Sterner | ............... E01C 19/21 404/113 |

(Continued)

FOREIGN PATENT DOCUMENTS

| | | | |
|---|---|---|---|
| EP | 0199371 A2 | 10/1986 | |
| EP | 2281948 A1 | 2/2011 | |
| WO | WO 81/03039 | * 4/1981 | ............... E01C 7/32 |

*Primary Examiner* — Raymond W Addie
(74) *Attorney, Agent, or Firm* — Oliff PLC

(57) ABSTRACT

A method for producing a roadway structure includes: applying pellets of an adhesive composition to a non-tacky surface of a substrate having a support structure, wherein the adhesive composition has at least one solid epoxy resin and at least one thermoplastic polymer that is solid at room temperature; and applying a bitumen-based bearing course. The method permits rapid and efficient production of a roadway structure with good adhesion between the substrate and the asphalt and is suitable in particular for the restoration of asphalt coverings, which must be carried out under time pressure. The application of primer courses is not required.

19 Claims, 1 Drawing Sheet

(56) References Cited

U.S. PATENT DOCUMENTS

| | | | | |
|---|---|---|---|---|
| 5,925,695 | A * | 7/1999 | Ohtsuka | C08L 63/08 |
| | | | | 264/331.13 |
| 7,767,259 | B2 * | 8/2010 | Fox | C08L 95/00 |
| | | | | 404/75 |
| 2005/0022696 | A1 * | 2/2005 | Blankenship | C08L 95/00 |
| | | | | 106/281.1 |
| 2009/0136758 | A1 * | 5/2009 | Minaba | B29B 9/04 |
| | | | | 428/407 |
| 2011/0081553 | A1 * | 4/2011 | Mehlmann | B05D 5/02 |
| | | | | 428/522 |
| 2011/0233105 | A1 * | 9/2011 | Bailey | C09D 195/00 |
| | | | | 206/525 |
| 2011/0250012 | A1 * | 10/2011 | Paschkowski | E01D 19/083 |
| | | | | 404/27 |
| 2012/0170977 | A1 | 7/2012 | Gantner et al. | |
| 2015/0086774 | A1 * | 3/2015 | Ackermann | B32B 5/02 |
| | | | | 428/317.3 |

* cited by examiner

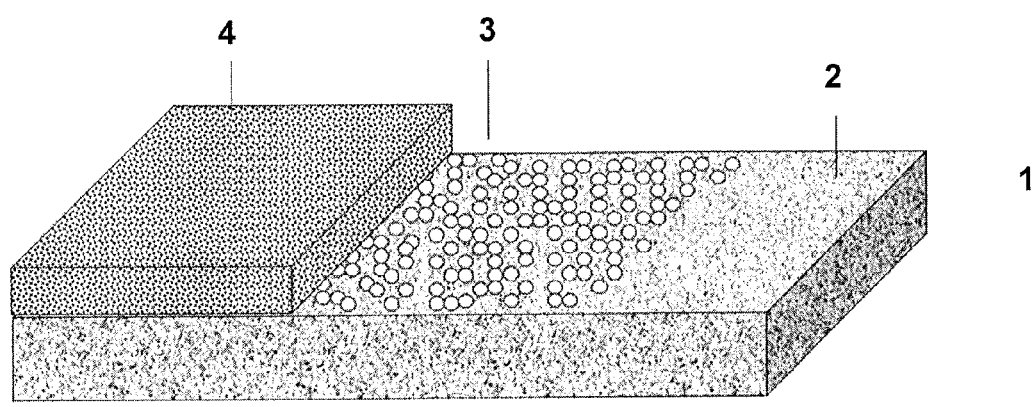

SIMPLE APPLICATION OF AN ADHESIVE MATERIAL TO A SUBSTRATE WITH EXCELLENT ADHESION TO ASPHALT

TECHNICAL FIELD

The invention relates to the field of roadways having an asphalt covering on a substrate comprising a support structure.

PRIOR ART

In road building, a bitumen-based bearing course is conventionally applied as the uppermost course.

However, the problem arises that a good adhesive bond must be present between the bearing course and the substrate, which naturally includes the adhesion of all the intermediate courses. Adhesion between the substrate and the bitumen-based bearing course is a problem which is very difficult to solve owing to the materials involved.

In asphalt application, bitumen emulsions, for example, are nowadays used as a bonding course. Approximately 0.3 kg/m$^2$ of bitumen emulsion are typically used thereby. The use of such a bonding course is time- and labour-intensive and cannot take place in all weather conditions. Moreover, a relatively long waiting time is necessary between application of the bonding course and the asphalt.

The time-consuming methods for forming a bonding course according to the prior art are relatively expensive and are problematic in particular when work must be carried out under time pressure, for example in the restoration of asphalt coverings, such as in the resurfacing of roads or bridges.

DESCRIPTION OF THE INVENTION

The object of the present invention is to overcome the disadvantages of the prior art. In particular, a method for producing a roadway structure which can be carried out quickly and leads to a good adhesive bond between the substrate and a bitumen-based bearing course is to be provided. Additional surface treatments, such as, for example, application of a bitumen emulsion, and waiting times between application of the individual courses are to be avoided. In addition, the method is to be simple, efficient and inexpensive.

Surprisingly, it has been possible to solve the problem by scattering pellets of a special adhesive composition onto a non-tacky surface of a substrate directly before application of the asphalt. When the asphalt is applied, the pellets are melted partially or completely by the temperature of the asphalt and thereby form an excellent bond with the asphalt and also with the substrate.

Accordingly, the invention relates to a method for producing a roadway structure according to Claim 1 and to a roadway structure according to Claim 13.

As compared with the prior art, the method according to the invention permits simpler application of the bonding course for asphalt coatings. The pellets can be scattered by hand or mechanically in one working step, regardless of the weather conditions. The costs for application of the adhesion promoter with the asphalt are thus reduced and no waiting time is required between the individual working operations. Coating with asphalt is thus possible in a much shorter period of time, which is again associated with a cost benefit. In the case of mechanical scattering, very precise quantity metering is additionally possible.

This is of interest especially for the restoration of asphalt coverings, for example of roads or bridges, which must be carried out under time pressure. The method according to the invention is therefore suitable in particular for any applications in which asphalt courses must be replaced in a short time, for example overnight on motorways, and a bonding course to the substrate is used.

A further advantage is that workers are able to walk on the non-tacky surface and it is even possible to place equipment on the non-tacky surface, which further simplifies the method.

A further aspect of the invention is the use of the pellets of an adhesive composition as an adhesive material between the substrate having a non-tacky surface and the bitumen-based bearing course. Particularly preferred embodiments of the invention are the subject-matter of the dependent claims.

WAYS OF CARRYING OUT THE INVENTION

In this document, "room temperature" is understood as being a temperature of 23° C.

The present invention relates in a first aspect to a method for producing a roadway structure, comprising the steps (i) applying pellets of an adhesive composition to a non-tacky surface of a substrate comprising a support structure, preferably a concrete structure, wherein the adhesive composition comprises at least one solid epoxy resin and at least one thermoplastic polymer that is solid at room temperature; and (ii) applying a bitumen-based bearing course.

The substrate comprises a support structure. The substrate can consist of the support structure, for example, or comprise one or more further courses above the support structure.

The support structure is preferably a structure of overground or underground construction. In particular, it can be a bridge, a gallery, a tunnel, an entry or exit ramp or a parking deck. A preferred example of such a support structure is a bridge. This support structure necessary for the roadway is a structure of a material which can have a bearing function. In particular, the material is a metal or a metal alloy or concrete, in particular reinforced concrete, preferably ferroconcrete. The support structure is preferably a concrete structure. The most preferred example of such a support structure is a bridge made of concrete.

The substrate can further have on the support structure courses which are conventional in a roadway structure, such as, for example, one or more primer courses, liquid plastics films, bitumen membranes and/or asphalt courses.

The asphalt course or asphalt covering is in particular bitumen-based bearing courses as will be described below. If the substrate has such an asphalt course as the uppermost course, it is generally a used or damaged asphalt covering which is to be restored.

The surface of the substrate, to which the pellets of the adhesive composition are applied, is a non-tacky surface. It is preferably a solid or hard surface. The surface is preferably dry, but it may also be wetted with water, for example by rain. By contrast, in the prior art, adhesive compositions are frequently applied in tacky surface courses in order to ensure adhesion with the substrate.

Tacky surfaces form in particular when a course composition is applied and the applied course has not yet cured.

The non-tacky surface of the substrate is preferably formed of concrete, for example the concrete support structure, asphalt, a plastics film or a bitumen membrane. The non-tacky surface of the substrate is particularly preferably made of concrete or asphalt.

It is preferred that the surface course of the substrate is not a primer course or bitumen emulsion. It is an advantage of the method that a primer course or bitumen emulsion is not required for bonding of the adhesive composition.

According to the invention, pellets of an adhesive composition are applied to the non-tacky surface of the substrate.

The adhesive composition comprises at least one solid epoxy resin and at least one thermoplastic polymer that is solid at room temperature.

The expression "solid epoxy resin" is well known to the person skilled in the epoxy field and is used in contrast to "liquid epoxy resins". The glass transition temperature of solid resins is above room temperature, that is to say they can be comminuted to free-flowing powders at room temperature.

Preferred solid epoxy resins have formula (I)

Preferred solid thermoplastic polymers are ethylene/vinyl acetate copolymers (EVA), in particular those having a proportion of vinyl acetate of less than 50% by weight, in particular having a proportion of vinyl acetate of from 10 to 40% by weight, preferably from 20 to 35% by weight, most preferably from 27 to 32% by weight.

It is further particularly preferred that the at least one thermoplastic polymer that is solid at room temperature is a terpolymer of ethylene, acrylic ester, for example ethyl acrylate, and maleic anhydride.

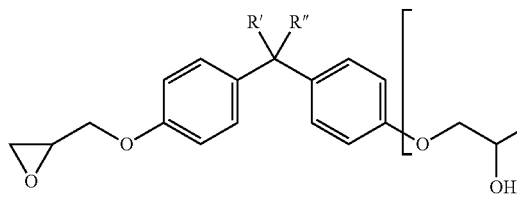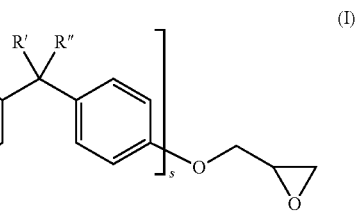

(I)

wherein the substituents R' and R" independently of one another represent either H or CH$_3$. Furthermore, the index s represents a value of >1.5, in particular from 2 to 12.

Such solid epoxy resins are obtainable commercially, for example under the trade names D.E.R.™ or Araldite® or Epikote from Dow or Huntsman or Hexion, respectively, and accordingly are well known to the person skilled in the art.

Compounds of formula (I) with an index s between 1 and 1.5 are referred to by the person skilled in the art as semi-solid epoxy resins. For the purposes of the present invention, they are likewise considered to be solid resins. However, preference is given to epoxy resins in the narrower sense, that is to say where the index s has a value of >1.5.

The thermoplastic polymer that is solid at room temperature is in particular a polymer that is solid at room temperature and that softens at a temperature above the softening temperature and finally becomes flowable.

In this document, softening temperatures or softening points are understood in particular as being measured by the ring and ball method according to DIN ISO 4625.

It is very advantageous if the thermoplastic polymer that is solid at room temperature has a softening point in the range of from 50° C. to 150° C., in particular from 90° C. to 130° C. Particular preference is given to thermoplastic polymers which have a softening point which is at least 25° C. below the temperature of the bitumen-based bearing course measured in step (ii) during application.

Suitable thermoplastic polymers that are solid at room temperature are in particular homopolymers or copolymers of at least one olefinically unsaturated monomer, in particular of monomers selected from the group consisting of ethylene, propylene, butylene, butadiene, isoprene, acrylonitrile, vinyl esters, in particular vinyl acetate, vinyl ethers, allyl ethers, (meth)acrylic acid, (meth)acrylic acid esters, maleic acid, maleic anhydride, maleic acid esters, fumaric acid, fumaric acid esters and styrene.

The copolymer can be formed of two, three or more different monomers. Copolymers which are prepared only from the monomers of the group listed above are particularly suitable.

Also particularly suitable are copolymers of olefinically unsaturated monomers modified by grafting reaction, in particular the copolymers of the preceding paragraph modified by grafting reaction.

Examples of the thermoplastic polymer that is solid at room temperature are polyolefins, in particular poly-α-olefins. Atactic poly-α-olefins (APAO) are most preferred.

It has been found to be particularly preferred if at least two different thermoplastic polymers that are solid at room temperature are used, which polymers preferably have different chemical compositions. Most preferably, one of the two different thermoplastic polymers is an ethylene/vinyl acetate copolymer.

Furthermore, it is advantageous if the further thermoplastic polymer is a copolymer in the preparation of which maleic acid or maleic anhydride was used as monomer or as grafting reagent.

The ratio by weight of solid epoxy resin to thermoplastic polymer that is solid at room temperature in the adhesive composition is preferably from 1:2 to 1:25, preferably from 1:4 to 1:20.

Furthermore, it has been found to be preferred if the adhesive composition further comprises at least one tackifier resin, in particular based on hydrocarbon resins, preferably on aliphatic hydrocarbon resins, in particular as are marketed, for example, by Exxon Mobil under the trade name Escorez™.

In an optional and preferred embodiment, the adhesive composition further comprises a chemical or physical blowing agent.

This can be exothermic blowing agents, such as, for example, azo compounds, hydrazine derivatives, semicarbazides or tetrazoles. Preferred blowing agents are azodicarbonamide and oxy-bis(benzenesulfonyl hydrazide). These blowing agents release energy during decomposition. Preference is further given to endothermic blowing agents, such as, for example, sodium bicarbonate or sodium bicarbonate/citric acid mixtures. Such chemical blowing agents are obtainable, for example, under the name Celogen™ from Chemtura. Likewise suitable are physical blowing agents, as are marketed under the trade name Expancel™ by Akzo Nobel.

Particularly suitable blowing agents are those as are obtainable under the trade name Expancel™ from Akzo Nobel or Celogen™ from Chemtura.

Preferred blowing agents are chemical blowing agents which release a gas when heated, in particular to a temperature of from 100 to 160° C.

The amount of physical or chemical blowing agent is in particular in the range of from 0 to 3% by weight, preferably in the range of from 0.2 to 2% by weight and particularly preferably in the range of from 0.5 to 1.5% by weight, based on the weight of the adhesive composition.

The adhesive composition can optionally comprise at least one curing agent for epoxy resins. The curing agents for epoxy resins are, for example, selected from dicyandiamide, guanamines, guanidines, aminoguanidines and derivatives thereof; substituted ureas, in particular 3-(3-chloro-4-methylphenyl)-1,1-dimethylurea (chlorotoluron), or phenyl-dimethylureas, in particular p-chlorophenyl-N,N-dimethylurea (monuron), 3-phenyl-1,1-dimethylurea (fenuron), 3,4-dichlorophenyl-N,N-dimethylurea (diuron), N,N-dimethylurea, N-isobutyl-N',N'-dimethylurea, 1,1'-(hexane-1,6-diyl)bis(3,3'-dimethylurea) as well as imidazoles, imidazole salts, imidazolines and amine complexes. These heat-activatable curing agents are preferably activatable at a temperature of from 80 to 160° C., in particular from 85° C. to 150° C., preferably from 90 to 140° C.

The adhesive composition can optionally additionally comprise further constituents, for example biocides, stabilizers, in particular heat stabilizers, plasticizers, pigments, adhesion promoters, in particular organosilanes, reactive binders, solvents, rheology modifiers, fillers or fibres, in particular glass, carbon, cellulose, cotton or synthetic plastics fibres, preferably fibres of polyester or of a homo- or co-polymer of ethylene and/or propylene or of viscose.

According to the invention, the adhesive composition is applied to the substrate in the form of pellets. Pellets of an adhesive composition are known to the person skilled in the art. They can be obtained, for example, by conventional granulation methods. The pellets can be, for example, in spherical or cylindrical form. The pellets have, for example, a diameter in the range of from 0.1 to 7 mm, preferably from 1 to 3 mm.

The pellets can be applied to the non-tacky surface of the substrate by, for example, manual or mechanical scattering of the pellets. Particular preference is given to mechanical scattering, in particular by means of a scattering device. In the case of mechanical scattering, very precise metering of the pellets is possible. Conventional scattering devices can be used. The width of the scattering device can be adapted to the width of the substrate which is to be scattered with the pellets.

In a preferred embodiment, the scattering device is integrated into the asphalting machine for subsequently applying the bitumen-based bearing course. In this manner, the application of the pellets and the application of the bearing course can be carried out in one working operation, which accelerates the work still further.

The amount of pellets applied to the surface of the substrate can vary within wide ranges according to the application but is, for example, in the range of from 10 to 1000 g/m$^2$, preferably from 50 to 300 g/m$^2$.

Finally, in step (ii), a bitumen-based bearing course is applied. It is preferred that the bitumen-based bearing course is applied directly to the pellets, preferably immediately after the pellets of the adhesive composition have been applied to the substrate. Waiting times can thus be avoided. The bitumen-based bearing course is generally also referred to as an asphalt course or asphalt covering.

The bitumen-based bearing course constitutes the roadway, which is in direct contact with vehicles. Melted asphalt or rolled asphalt can preferably serve as the bitumen-based bearing course. If the bitumen-based bearing course, or bituminous bearing course, is made of rolled asphalt, it is heated, for example, to a temperature of typically from 140° C. to 160° C. before application and preferably rolled by means of a roller.

Application of the bituminous bearing course is well known to the person skilled in the art and will therefore not be discussed further here.

Suitable asphalt types are in particular asphalt types having a mix temperature in the range of from 100 to 240° C. The asphalt types preferably to be used in the present invention are hot mix asphalt (HMA), warm mix asphalt (WMA), half warm mix asphalt and cold mix asphalt.

In addition to bitumen, the bearing course can comprise further possible constituents known to the person skilled in the art. The person skilled in the art knows the type and amount of the constituents of bitumen-based compositions which are used to produce roadways. The fact that the bearing course conventionally comprises mineral fillers, in particular sand or chippings, in a substantial amount is of particular importance here.

When applying a bitumen-based bearing course, the pellets are melted and sufficient adhesion between the two is thus ensured.

When applying the molten bitumen, the pellets of the adhesive composition are melted partially or completely by the temperature of the bitumen and thereby form an excellent bond with the asphalt and with the substrate. An otherwise conventional adhesion promoter, such as, for example, a primer or base course, into which the adhesive composition is embedded, is not required.

If the pellets of the adhesive composition comprise a chemical or physical blowing agent, as is preferred, the blowing agent is activated when the molten bitumen comes into contact with the pellets, so that the adhesive composition readily foams, resulting in an additional improvement in the adhesion.

Upon melting, the pellets can form a largely homogeneous thermoplastic course or can dissolve in the bitumen close to the surface and form a thermoplastic-containing boundary phase course. It is therefore also possible in the method according to the invention that the pellets of the adhesive composition do not form a discrete or individual course.

It is preferred that the bitumen-based bearing course is applied to the surface of the substrate provided with the pellets within a period of less than 24 hours, preferably less than 1 hour, after application of the pellets.

According to the invention, the pellets preferably form an adhesive bond between a substrate, which has a non-tacky surface of concrete, asphalt, liquid plastics film or bitumen membrane, and the bitumen-based bearing course or an asphalt course.

In a preferred embodiment, a roadway structure, in particular a roadway structure having an asphalt covering, is restored or repaired by the method according to the invention.

It is preferred that the roadway structure to be repaired, which has optionally been pretreated, serves as the substrate for the application of the pellets, or an upper portion of the roadway structure to be repaired is removed in order to form a substrate to which the pellets are applied.

The restoration of an asphalt covering can therefore be carried out in such a manner that the pellets are applied directly to the asphalt covering to be restored, and immediately thereafter the new bitumen-based bearing course is applied. In an alternative method, portions of the roadway structure to be restored, for example of the asphalt covering to be restored, are removed, and the pellets and, immediately thereafter, the new bitumen-based bearing course are applied to the substrate that remains. In both cases, prior application of a primer course is not required.

A further aspect of the present invention relates to the roadway structure obtained by the method according to the invention.

The roadway structure so produced exhibits a long-lasting bond between the individual courses, which is dimensionally stable in the long term even under large axle loads. The use of the pellets avoids the pretreatment of surfaces which is otherwise required, for example treatment with a primer, and provides improved adhesion.

The method according to the invention, or the pellets of the adhesive composition used according to the invention, are suitable in particular for the repair of a roadway structure, in particular of a roadway structure having an asphalt covering, the roadway structure preferably being a road or a bridge. The method is particularly suitable when the work is to be carried out under time pressure.

BRIEF DESCRIPTION OF THE DRAWING

FIG. 1 shows schematically the sequence of courses for the method according to the invention for producing a roadway structure. Only the elements that are essential for the immediate understanding of the invention are shown.

FIG. 1 shows a roadway structure 1 in which pellets of the adhesive composition 3 have been applied to a non-tacky surface of a substrate 2 and a bitumen-based bearing course 4 has been applied thereto. The non-tacky surface of the substrate 2 is preferably concrete or asphalt. The surface of the substrate is, for example, formed by a concrete support structure or an asphalt covering.

LIST OF REFERENCE NUMERALS

1 Roadway structure
2 Substrate comprising support structure, preferably concrete support structure
3 Pellets of adhesive composition
4 Bitumen-based bearing course

EXAMPLE

An adhesive composition comprising the constituents mentioned in Table 1 in the amounts indicated therein was prepared.

TABLE 1

| | | Parts by weight |
|---|---|---|
| EVA | Ethylene/vinyl acetate copolymer (vinyl acetate content 28% by weight, softening temperature (ring & ball method according to DIN ISO 4625): 106° C.) | 25.0 |
| MAM-EVA | Maleic anhydride-grafted ethylene/vinyl acetate copolymer (maleic anhydride content: 0.2-0.4% by weight) | 23.4 |
| Araldite ® | Solid epoxy resin | 4.0 |
| Hydrocarbon resin | Tackifier resin | 10.0 |
| Chalk | Filler | 36.8 |
| Sodium bicarbonate | Blowing agent | 0.8 |

In order to prepare the adhesive composition, the constituents were mixed with one another in a twin-screw extruder at a temperature of 80-120° C. Pellets having a diameter of approximately from 1 to 3 mm were formed by subsequent granulation. The pellets obtained were tested as follows.
A layer of approximately 5 cm was removed from a rolled asphalt (approximately 10 cm thick) by milling.
Conventional bitumen emulsion (0.3 kg/m²) was then applied to one sample. Pellets of the adhesive composition of Table 1 (0.2 kg/m²) were applied to a second sample.
A layer of rolled asphalt was then applied to each of the two samples (5 cm, 160° C.).
The bond between the layers is determined in accordance with ZTV Asphalt-StB 07 (norm: >15 kN).

The use of 0.3 kg/m² of bitumen emulsion in accordance with the prior art leads to a tensile adhesion value of 30 kN in respect of the layer combination asphalt/asphalt used.

The use of 0.2 kg/m² of pellets of the adhesive composition of Table 1 leads in the case according to the invention to a measured value of >50 kN for the layer combination asphalt/asphalt. The amount of adhesive composition used can consequently be reduced further in order to achieve the same tensile adhesion value as is achieved according to the prior art with bitumen emulsion. This results in a considerable cost reduction.

The invention claimed is:

1. A method for producing a roadway structure, comprising the steps
   (i) applying pellets of an adhesive composition to a non-tacky surface of a substrate comprising a support structure, wherein the adhesive composition comprises at least one solid epoxy resin and at least one thermoplastic polymer that is solid at room temperature; and
   (ii) applying a bitumen-based bearing course.

2. The method according to claim 1, wherein the bitumen-based bearing course is applied to the surface of the substrate provided with the pellets within a period of less than 1 hour after application of the pellets.

3. The method according to claim 1, wherein the pellets are applied by manually or mechanically scattering the pellets onto the surface of the substrate.

4. The method according to claim 1, wherein the pellets have a diameter in a range of from 0.1 to 7 mm.

5. The method according to claim 1, wherein the surface course of the substrate is not a primer course.

6. The method according to claim 1, wherein the amount of pellets applied is in the range of from 10 to 1000 g/m².

7. The method according to claim 1, wherein a roadway structure is repaired by the method.

8. The method according to claim 7, wherein the roadway structure to be repaired, which has optionally been pretreated, serves as the substrate for application of the pellets, or an upper portion of the roadway structure to be repaired is removed to form a substrate to which the pellets are applied.

9. The method according to claim 1, wherein the bitumen-based bearing course is applied directly to the pellets applied to the substrate.

10. The method according to claim 1, wherein the non-tacky surface of the substrate is formed of concrete, asphalt, a liquid plastics film or a bitumen membrane.

11. The method according to claim 1, wherein the adhesive composition further comprises a chemical or physical blowing agent based on the weight of the adhesive composition.

12. The method according to claim 1, wherein the at least one thermoplastic polymer that is solid at room temperature comprises an ethylene/vinyl acetate copolymer or a terpolymer of ethylene, acrylic ester and maleic anhydride.

13. A roadway structure obtained by the method according to claim 1.

14. The method according to claim 1, wherein the at least one solid epoxy resin comprises one or more compounds of the following formula:

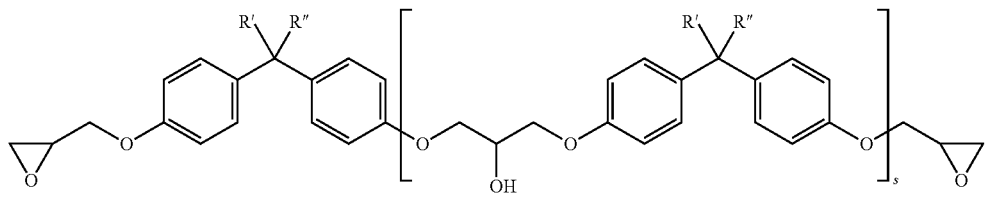

where
- R' and R" are, independently of one another, either H or CH$_3$, and
- s is from 2 to 12.

15. The method according to claim 11, wherein the content of the blowing agent in the range of from 0.2 to 2% by weight based on the weight of the adhesive composition.

16. The method according to claim 11, wherein the blowing agent comprises azodicarbonamide.

17. The method according to claim 1, wherein the pellets form an adhesive bond between the non-tacky surface of the substrate and the bitumen-based bearing course.

18. A method comprising:
applying pellets of an adhesive composition comprising at least one solid epoxy resin and at least one thermoplastic polymer that is solid at room temperature as an adhesive bonding material between a substrate having a non-tacky surface and a bitumen-based bearing course.

19. The method according to claim 18, wherein
the non-tacky surface is a roadway structure in need of repair, the roadway structure having an asphalt covering, and
the pellets are applied in an amount effective to repair the roadway structure.

\* \* \* \* \*